United States Patent [19]
Orino et al.

[11] Patent Number: 5,530,577
[45] Date of Patent: Jun. 25, 1996

[54] TWO-WAY OPTICAL COMMUNICATION APPARATUS

[75] Inventors: Kanjo Orino, Tokyo; Shigeru Oshima, Yokohama; Tetsuo Sakanaka, Sagamihara, all of Japan

[73] Assignee: Canon Kabushiki Kaisha, Tokyo, Japan

[21] Appl. No.: 325,141

[22] Filed: Oct. 21, 1994

Related U.S. Application Data

[63] Continuation of Ser. No. 120,342, Sep. 14, 1993, abandoned.

[30] Foreign Application Priority Data

Sep. 21, 1992 [JP] Japan .................. 4-251406

[51] Int. Cl.$^6$ .................................................. H04B 10/00
[52] U.S. Cl. .................. 359/152; 359/156; 359/159
[58] Field of Search ................................. 359/152, 156, 359/113, 122, 129, 143, 159, 168, 170, 193, 495–497; 280/216, 225; 356/351

[56] References Cited

U.S. PATENT DOCUMENTS

| | | | |
|---|---|---|---|
| 4,199,226 | 4/1980 | Weber et al. | 359/497 |
| 4,888,816 | 12/1989 | Sica, Jr. | 359/152 |
| 5,113,403 | 5/1992 | Block et al. | 359/152 |

FOREIGN PATENT DOCUMENTS

| | | | |
|---|---|---|---|
| 1305734 | 12/1989 | Japan . | |
| 0305734 | 12/1989 | Japan | 359/156 |
| 2-198234 | 8/1990 | Japan . | |

*Primary Examiner*—Leslie Pascal
*Assistant Examiner*—Kinfe-Michael Negash
*Attorney, Agent, or Firm*—Fitzpatrick, Cella, Harper & Scinto

[57] ABSTRACT

An optical communication apparatus that includes a polarization beam splitter which synthesizes an optical axis of a light emitting optical system having a light emission element for emitting a linearly polarized light and an optical axis of a light receiving optical axis to make the optical axis for reception coincide with the optical axis for transmission. A phase plate is provided in such a manner as to be rotatable by a predetermined angle about the common axis. An optical axis of the phase plate of each of the associated communication apparatuses is set at an adequate angle before installation thereof.

13 Claims, 7 Drawing Sheets

FIG. 4(A)
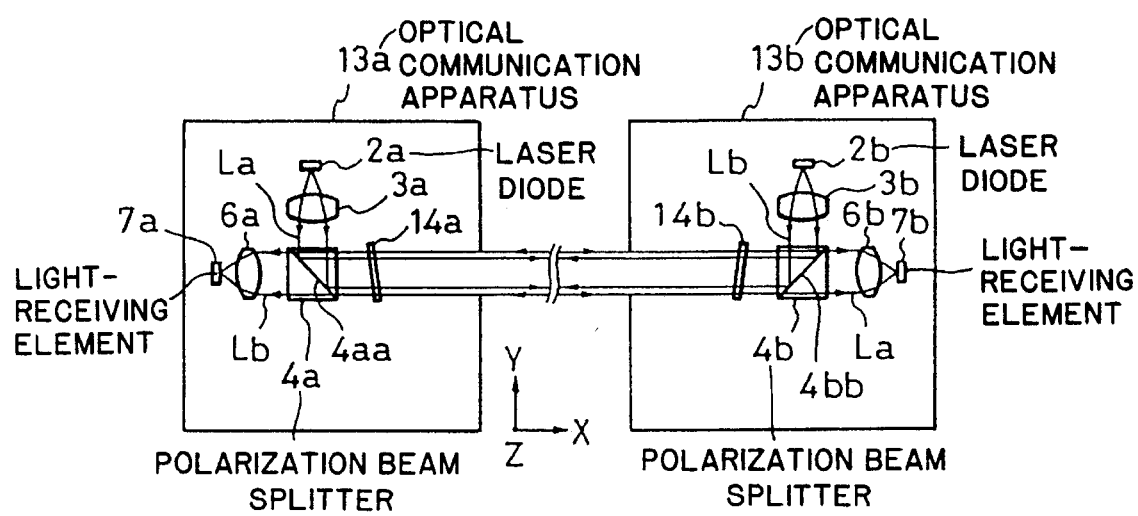
FIG. 4(B)
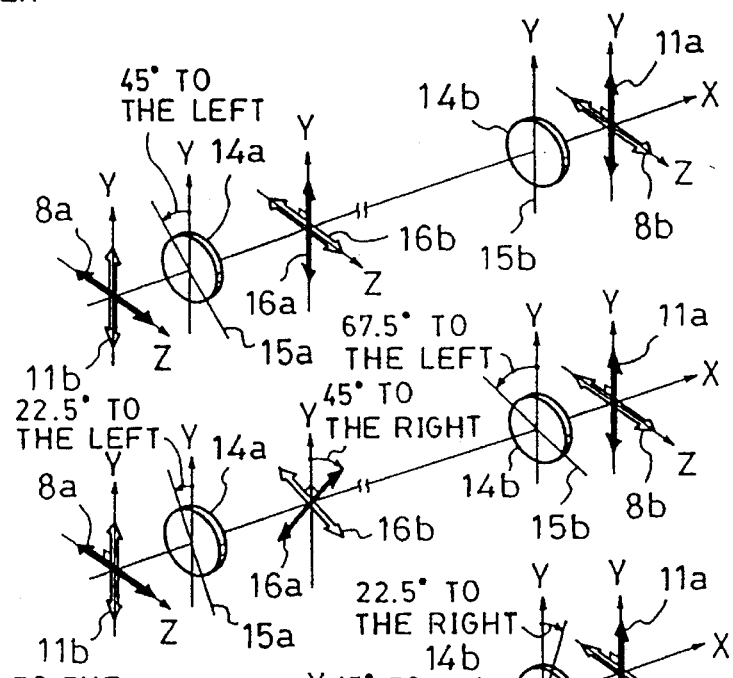
FIG. 4(C)
FIG. 4(D)
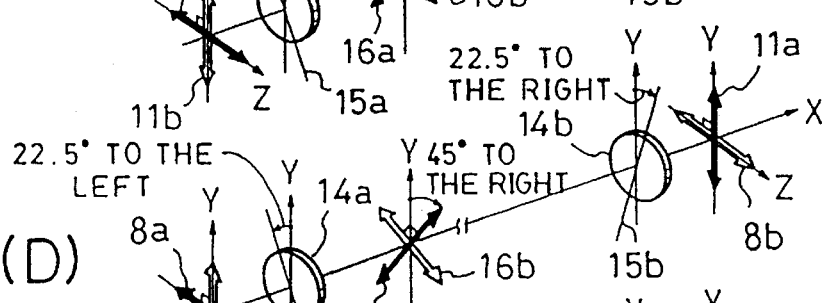
FIG. 4(E)
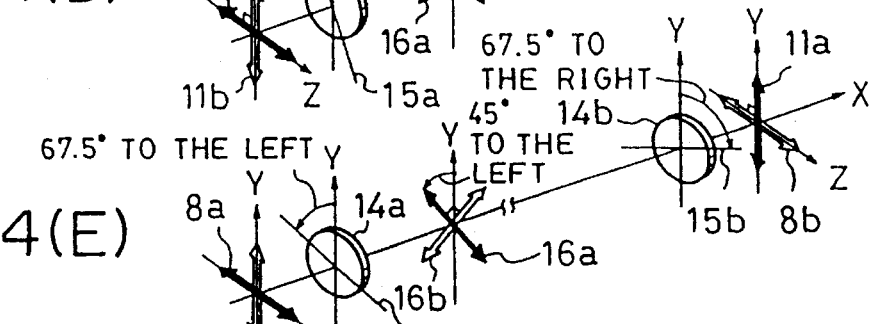

FIG. 5(A)
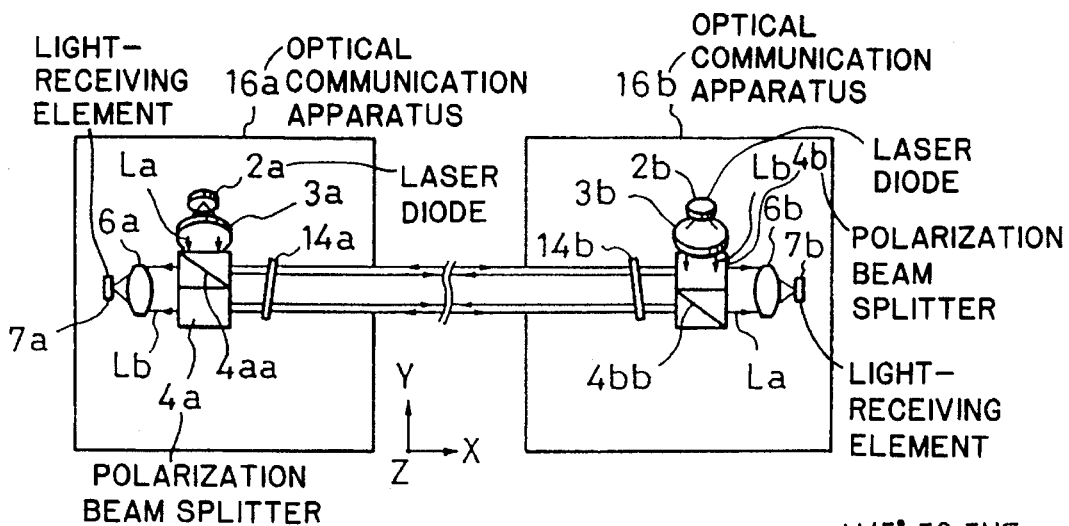
FIG. 5(B)
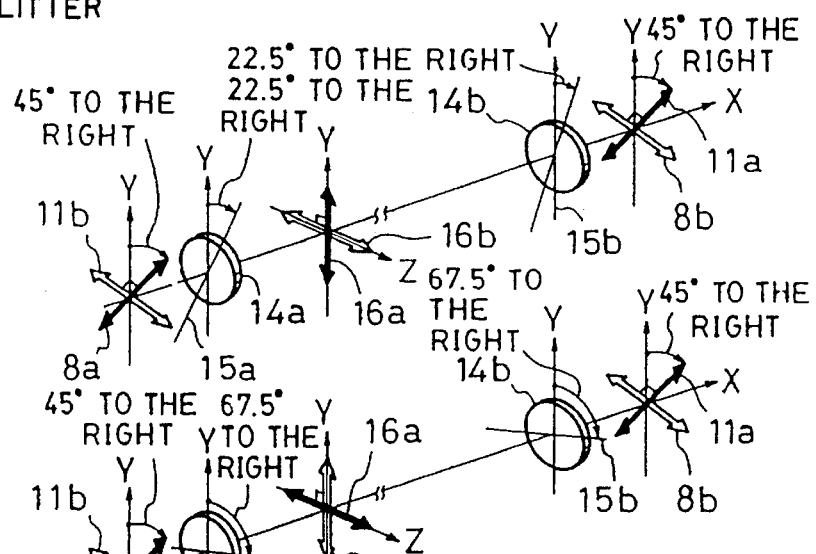
FIG. 5(C)
FIG. 5(D)
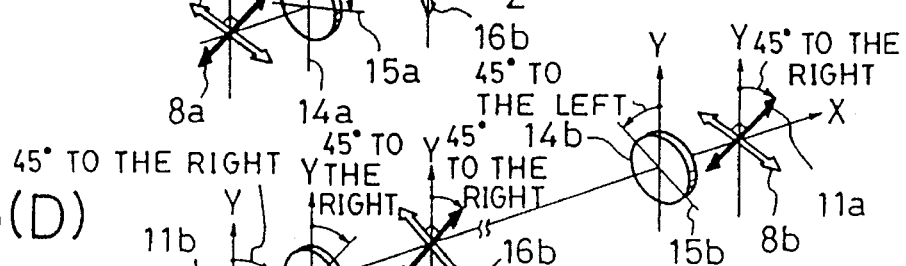
FIG. 5(E)
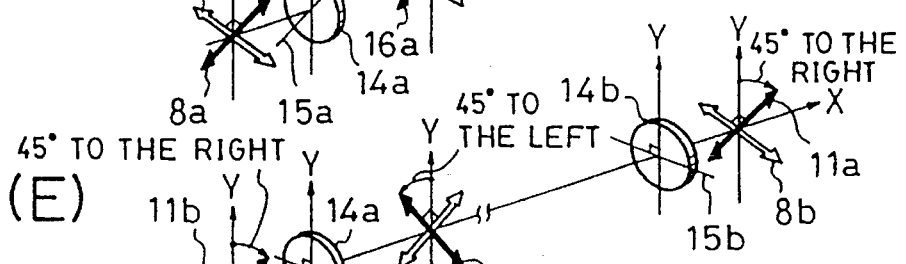

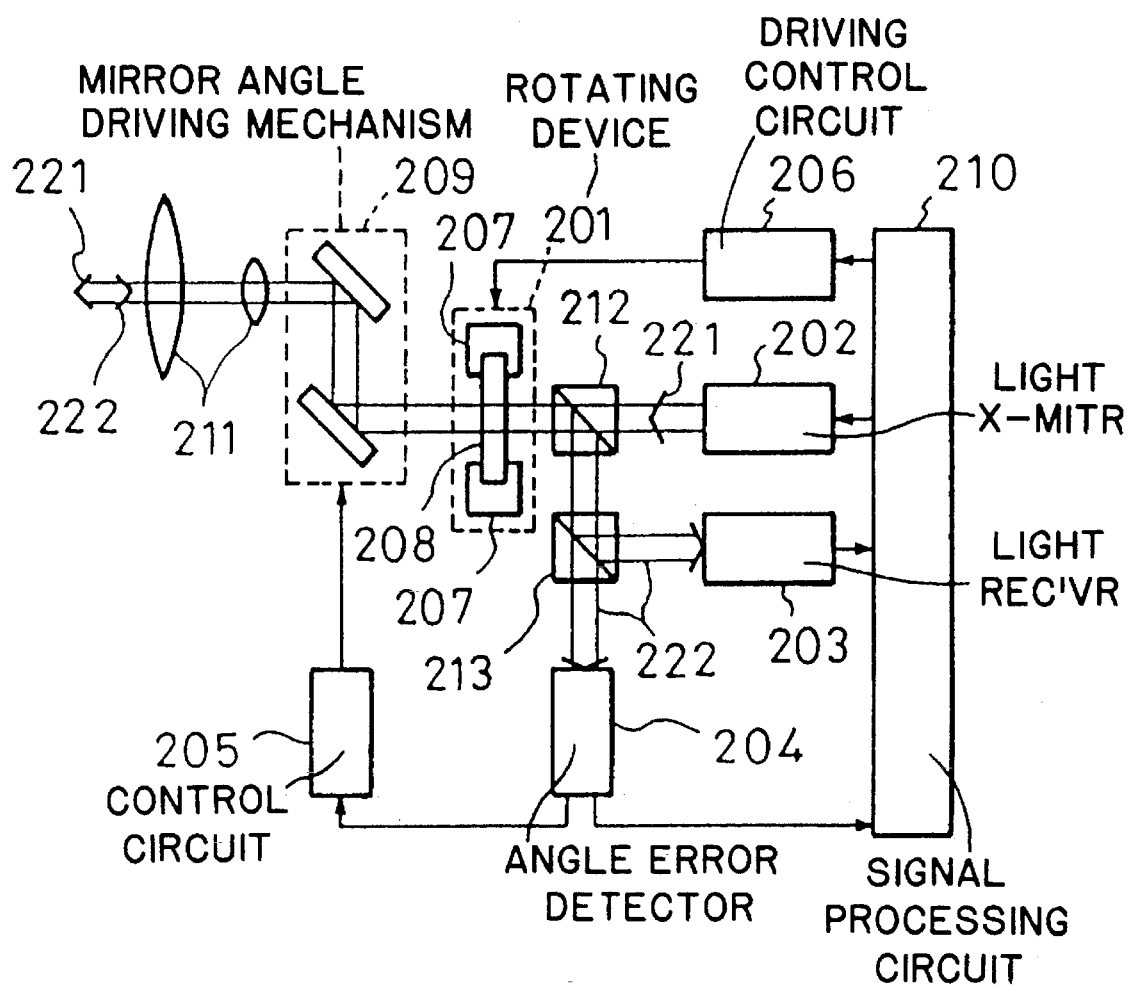

TWO-WAY OPTICAL COMMUNICATION APPARATUS

This application is a continuation of application Ser. No. 08/120,342 filed Sep. 14, 1993, now abandoned.

BACKGROUND OF THE INVENTION

1. Field of the Invention

The present invention relates to a two-way optical communication apparatus for performing transmission/reception of a signal through the medium of a light beam by utilizing space as a transmission path, and more particularly, to an optical communication apparatus which exhibits excellent transmission efficiency. The excellent transmission efficiency is achieved by using a phase plate to convert the polarized state of a polarized light beam.

2. Description of the Related Art

Two-way optical communication apparatuses that utilize a phase plate to convert the polarized state of a polarized light are known in the art.

FIGS. 6(A) and 6(B) illustrate an example of such an apparatus. This apparatus is disclosed in U.S. Pat. No. 4,199,226. The apparatus utilizes a source of a linearly polarized laser beam and a quarter-wave plate, and is used for two-way communications in which the laser beam is transmitted through a transmission space as circularly polarized light and in which that laser beam is received on a light-receiving element as a linearly polarized light. A beam emitted from a laser source 101 enters a lens 102. The lens 102 creates a beam made up of parallel rays of light from the incident light. The resultant beam made up of parallel rays of light enters a polarization beam splitter 103. At that time, a joining surface of the polarization beam splitter 103 passes most of the linearly polarized laser beam therethrough. Thereafter, an etalon 104 narrows the spectral bandwidth of the laser beam. The laser beam emitted from the etalon 104 passes through a laser oscillation-stabilizing returning-light generating element 105, and then enters a quarter-wave plate 106. The optical axis of the quarter-wave plate 106 is located at a position that allows the incident linearly polarized laser beam to emerge therefrom as circularly polarized. Thereafter, the laser beam is transmitted toward a remote party through a beam expander 107.

A circularly polarized laser beam 108, which is received from the remote party, enters the quarter-wave plate 106 through the beam expander 107. The laser beam emerges from the quarter-wave plate 106 as linearly polarized light that can be reflected by the joining surface of the polarization beam splitter 103. Therefore, the joining surface of the polarization beam splitter 103 passes most of the laser beam. The laser beam that has been reflected by the polarization beam splitter 103 passes through a polarization filter 108, which produces a linearly polarized light having a larger polarization ratio. After the laser beam has passed through an interference filter 109 for removing external light, it is received by a light-receiving element 112 through a lens 110.

FIG. 7 illustrates another example of the above-described type of apparatus. This apparatus is disclosed in Japanese Patent Laid-Open No. Hei 2-198234. The apparatus utilizes a source of a linearly polarized laser beam and a half-wave plate, and is designed to perform two-way communications by transmitting the laser beam as a linearly polarized light at any point of the space through which the laser beam passes.

A light 221, which is to be transmitted is emitted from a light transmitter 202. A polarization beam splitter 212 passes most of the light 221 therethrough. The light beam that has passed through the polarization beam splitter 212 passes through a polarization direction rotating device 201, a mirror angle driving mechanism 209 and then a beam expander 211, and is then transmitted.

A received light 222 passes through the beam expander 211 and then the mirror angle driving mechanism 209. A control circuit 205 controls mirror angle driving mechanism 209. An angle error detector 204 detects a status of a light reception and the control circuit 205 controls the driving mechanism 209 so that the status of the light reception will be at a most preferable level. Thereafter, the direction of polarization of the received light 222 is rotated such that it is perpendicular to the direction of polarization of the light to be transmitted 202. The joining surface of the polarization beam splitter 212 passes most of the received light emerging from the polarization direction rotating device 201. After the light beam is divided by a beam splitter 213, the divided beams enter a light receiver 203 and the angle error detector 204, respectively. The polarization direction rotating device 201 is made up of a half-wave plate 208 and a half-wave plate driving portion 207, and is designed to freely set the direction of polarization of the beam by rotating the half-wave plate 208 by, for example, a motor. Control of the rotating operation by the polarization direction rotator 201 may be performed by using the data which is input to a control signal processing circuit 210 from an external circuit. Alternatively, control of the rotating angle of the polarization direction rotating device 201 may be performed by sending, to the half-wave plate driving portion 207 of the polarization direction rotating device 201 through a polarization direction rotating device driving control circuit 206, a signal representing the amount or direction of the rotation, which is obtained by identifying the received signal from the light receiver 203 or the angle error detector 204 by means of the control signal processing circuit 210.

In the apparatus shown in FIG. 6(A), there is no clear description regarding the optical axis of the crystal of the quarter-wave plate 106. In addition, there is no description about the coincidence of the light communication apparatuses of the two parties associated with communications.

If the apparatus shown in FIG. 6(A) is used to perform communications with a remote apparatus, which has the same structure as that of the apparatus shown in FIG. 6(A) and which employs a quarter-wave plate whose optical axis is inclined by 45 degrees to the left from the upward direction of the vertical direction as viewed from the front side of the apparatus so as to allow the incident light to emerge therefrom as circularly polarized, a laser beam whose plane of polarization 8a is coincident with the vertical direction (in a Y-axis direction in FIGS. 6(A) and 6(B)) passes through the quarter-wave plate whose optical axis 9a is inclined by 45 degrees to the right from the vertical direction. The laser beam emerging from the quarter-wave plate as a circularly polarized light 10a propagates in the transmission space, as shown in FIG. 6(B). This light beam enters the remote apparatus. Since an optical axis 9b of a quarter-wave plate 5b, of the remote apparatus, is inclined by 45 degrees to the left from the vertical direction, as shown in FIG. 6(B), a plane of polarization 11a of the laser beam, which has passed through the quarter-wave plate 9b, is coincident with the vertical direction, and the plane of polarization 11a of the light beam that is received by the remote apparatus hence coincides with the plane of polarization 8b of the light beam transmitted from the remote apparatus. Therefore, the polarization beam splitter 103 cannot separate the polarized light, and most of the received light enters the laser diode 101, making reception impossible.

Further, the two-way optical communication apparatus shown in FIG. 7 is used under the condition that the plane of polarization of a received light is unknown. Consequently, control of the rotation of the half-wave plate is required. This makes the structure of the apparatus complicated and thus increases production cost.

SUMMARY OF THE INVENTION

An object of the present invention is to provide an optical communication apparatus which is capable of very efficient two-way communications without generating reception inability, such as shown in FIGS. 6(A) and 6(B), when a quarter-wave plate is employed, and which is capable of very efficient two-way communications by a simple operation conducted before installation of the apparatus without using a complicated means, such as control of rotation, when a half-wave plate is employed.

To achieve the above object, the present invention provides an optical communication apparatus which includes a polarization beam splitter for synthesizing an optical axis of a light emitting optical system having a light emission element for emitting a linearly polarized light and an optical axis of a light receiving optical axis to make the optical axis for reception coincide with the optical axis for transmission. A phase plate is provided in such a manner as to be rotatable by a predetermined angle about the common axis. An optical axis of the phase plate of each of the associated communication apparatuses is set at an adequate angle before installation thereof.

According to another aspect of the present invention, an optical communication apparatus comprises a light-emitting optical system comprising light-emission means for transmitting a linearly polarized light beam along a transmitting optical axis to a remote optical communication apparatus, a light-reception optical system for receiving a polarized light beam, along a receiving optical axis, which is transmitted from the remote apparatus, a polarization beam splitter located along a coincident optical axis where the transmitting optical axis coincides with the receiving optical axis, the polarization beam splitter reflecting one of and transmitting the other of the linearly polarized light beam to the remote apparatus and the polarized light beam from the remote apparatus, and a phase plate rotatable to a predetermined angle about the coincident optical axis, the phase plate transmitting and having the ability to alter the polarization of both the linearly polarized light beam to the remote apparatus and the polarized light beam from the remote apparatus, to allow communication between the optical communication apparatus and the remote apparatus.

According to yet another aspect of the present invention, an optical communication apparatus comprises a light-emitting optical system comprising light emission means for transmitting a linearly polarized light beam along a transmitting optical axis to a remote optical communication apparatus, a light reception optical system for receiving a polarized light beam, along a receiving optical axis, which is transmitted from the remote apparatus, a polarization beam splitter located along a coincident optical axis where the transmitting optical axis coincides with the receiving optical axis, the polarization beam splitter reflecting one of and transmitting the other of the linearly polarized light beam to the remote apparatus and the polarized light beam from the remote apparatus, and a half-wave plate rototable to a predetermined angle about the coincident optical axis, the half-wave plate having the ability to alter the polarization of light transmitted therethrough, the half-wave plate transmitting both the linearly polarized light beam to the remote apparatus and the polarized light beam from the remote apparatus, to allow communication between the optical communication apparatus and the remote apparatus. Consequently, very efficient two-way communication can be performed between the two apparatuses.

BRIEF DESCRIPTION OF THE DRAWINGS

FIGS. 4(A), 4(B), 4(C), 4(D), and 4(E) illustrate the essential parts of a third embodiment of the optical communication apparatus according to the present invention;

FIGS. 5(A), 5(B), 5(C), 5(D), and 5(E) illustrate the essential parts of a fourth embodiment of the optical communication apparatus according to the present invention;

FIG. 7 illustrates a conventional optical communication apparatus.

DETAILED DESCRIPTION OF THE PREFERRED EMBODIMENTS

Figure 1A:
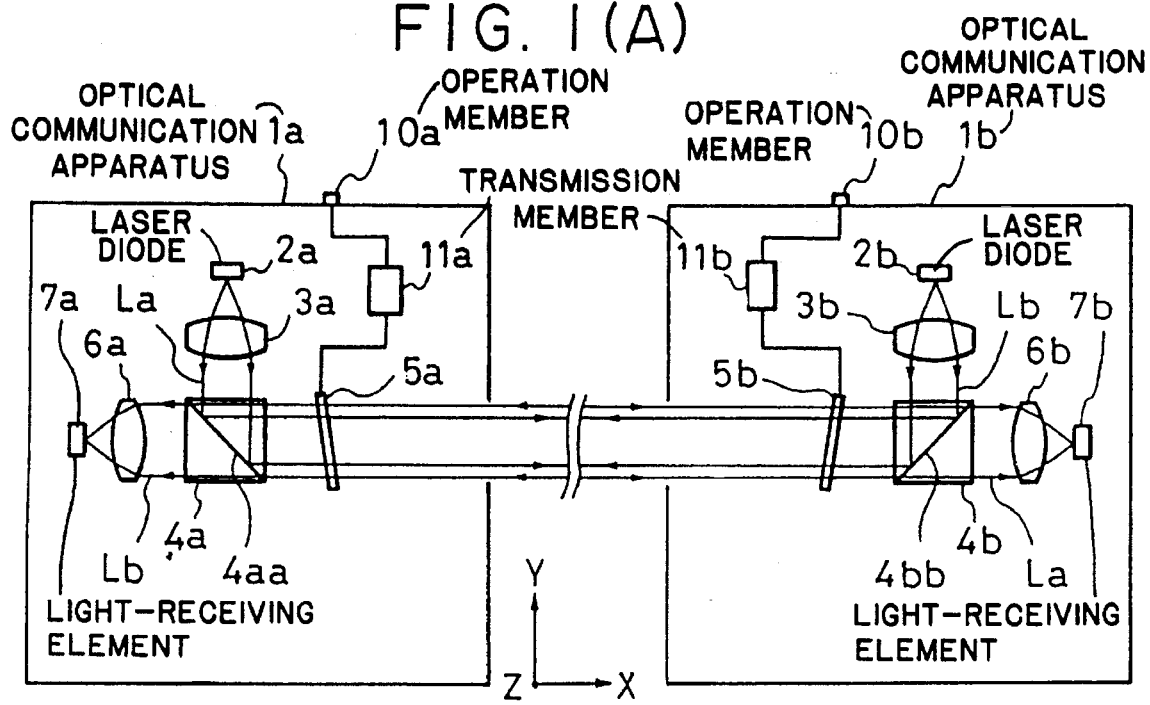
FIGS. 1(A) and 1(B) illustrate the essential parts of a first embodiment of an optical communication apparatus according to the present invention.
Figure 1B:
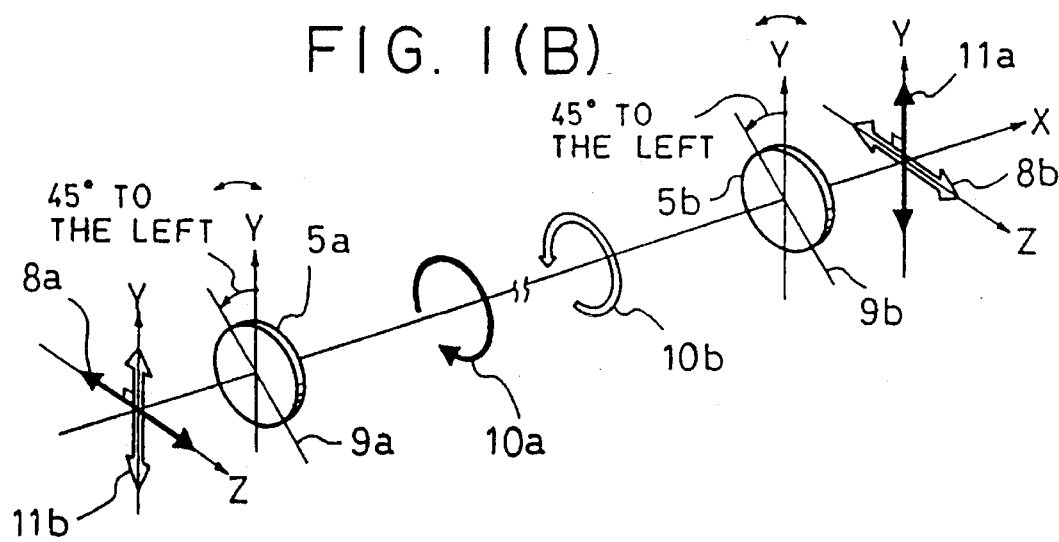

FIGS. 1(A) and 1(B) are schematic views of the essential parts of a first embodiment of an optical system according to the present invention. In these figures, reference numerals 1a and 1b respectively denote optical communication apparatuses having the same structure and which are disposed with a certain distance therebetween so as to perform communications. The optical communication apparatus 1a includes a laser diode 2a, a lens group 3a having a positive power and creating a beam made up of parallel rays from a laser beam La, which is emitted from the laser diode 2a, a polarization beam splitter 4a having a joining surface 4aa, which reflects most of the laser beam La, a quarter-wave plate 5a, which is rotatable by 90 degrees about a common axis so as to emit the laser beam La as a circularly polarized light, a lens group 6a having a positive power and condensing a laser beam Lb arriving from a remote optical communication apparatus 1b, and a light-receiving element 7a for receiving the laser beam Lb. The optical communication apparatus 1b as viewed to the right in FIG. 1(A) has the same structure as that of optical communication apparatus 1a with the exception of the optical axis of the quarter-wave plate. That is, the optical axis of the quarter-wave plate of one of the apparatuses is rotated by 90 degrees with respect to that of the quarter-wave plate of the other apparatus by means of operation members 10a, 10b and transmission members 11a, 11b. This is performed when the apparatuses 1a and 1b are installed. Although a beam expander (not shown) is disposed beyond each of the beam splitters 4a and 4b, it has no connection with the present invention. Thus, a description thereof is omitted.

Transmission of a light signal from the optical communication apparatus 1a to the remote apparatus 1b will now be described. The laser beam La emerging from the laser diode 2a is a linearly polarized light whose plane of polarization corresponds to a Z-axis direction shown in FIG. 1(A). The lens group 3a having a positive power creates a beam made up of parallel rays of light from the laser beam La, and sends that beam to the polarization beam splitter 4a. The joining surface 4aa of the polarization beam splitter 4a reflects most of the laser beam La. The reflected light is incident on the quarter-wave plate 5a. An optical axis 9a of the quarter-wave plate 5a is inclined by 45 degrees to the left of the Y-axis, i.e., by 45 degrees to the right of a plane of polarization 8a of the laser beam La, in FIG. 1(B). Thus, the laser beam La that is incident on the quarter-wave plate 5a emerges therefrom as circularly polarized light 10a. Thereafter, the laser beam La is transmitted toward the remote apparatus 1b.

The laser beam La incident on the remote apparatus 1b emerges from the quarter-wave plate 5b whose optical axis is rotated by 45 degrees to the left of the Y-axis as viewed from the front of the apparatus as a linearly polarized light whose plane of polarization 11a is coincident with the vertical direction. The joining surface 4bb of the polarization beam splitter 4b having the same characteristics as those of the polarization beam splitter 4a transmits most of the laser beam La having this plane of polarization, i.e., the light loss of the polarization beam splitter 4b is less. Thereafter, the laser beam La is condensed on the light-receiving element 7b by the lens group 6b having a positive power.

Transmission of a light signal from the optical communication apparatus 1b to the optical communication apparatus 1a is performed in the same manner as the above-described manner. More specifically, a laser beam Lb is emitted from the laser diode 2b as a linearly polarized light whose plane of polarization 8b is coincident with the horizontal direction (in a Z-axis direction in FIGS. 1(A) and 1(B)). This laser beam Lb emerges from the quarter-wave plate 5b as circularly polarized light 10b and then propagates in space. The laser beam Lb that is incident on the apparatus 1a emerges from the quarter-wave plate 5a as polarized light whose plane of polarization 11b coincides with the vertical direction (the Y-axis direction shown in FIG. 1). The joining surface 4aa of the polarization beam splitter 4a transmits most of the laser beam Lb. Thereafter, the laser beam Lb is condensed on the light-receiving element 7a by the lens group 6a having a positive power.

Thus, very efficient two-way communications can be performed when the optical axis of the quarter-wave plate of one of the apparatuses is rotated by 90 degrees relative to the optical axis of the quarter-wave plate of the other apparatus. The setting of the rotational angle of each of the quarter-wave plates is performed when the apparatuses are installed.

FIG. 1(B) shows only an example of the direction of rotation of the quarter-wave plate. An inverted combination of rotational directions, in which the optical axis of each of the quarter-wave plates is inclined by 45 degrees to the right of the Y-axis, may also be employed. In that case, transmission is performed in the same manner as that of the above-described example, except that the direction in which the circularly polarized light is rotated is inverted, and hence the same effect as that obtained in the structure shown in FIG. 1(B) can be obtained.

Figure 2A:
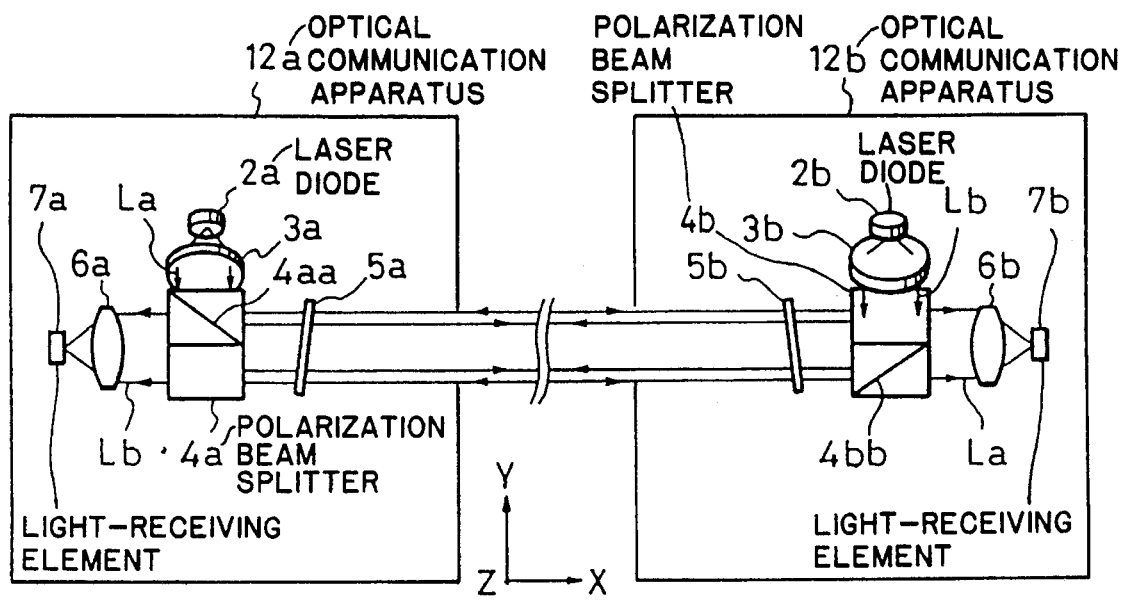
FIGS. 2(A) and 2(B) illustrate the essential parts of a second embodiment of the optical communication apparatus according to the present invention.
Figure 2B:
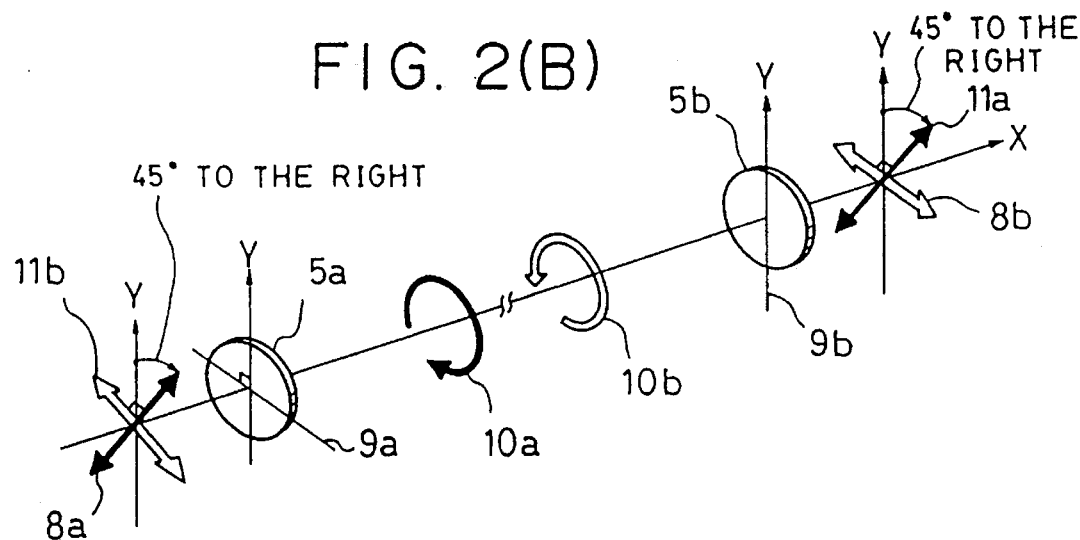
Figure 3:
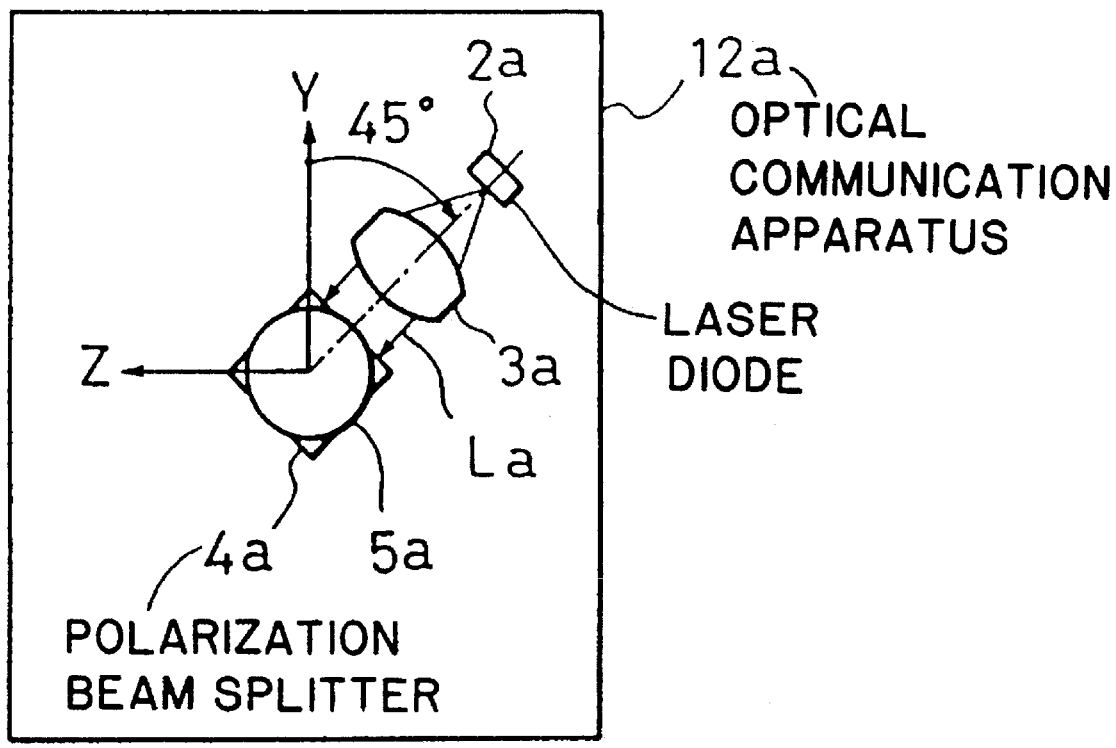
FIG. 3 is a front view of the optical communication apparatus of FIG. 2.
Figure 6A:
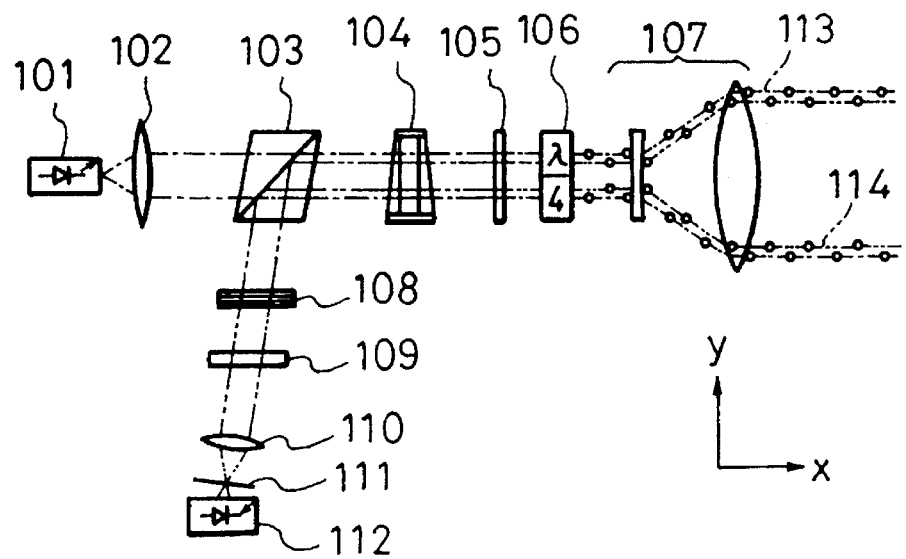
FIGS. 6(A) and 6(B) illustrate a conventional optical communication apparatus.
Figure 6B:
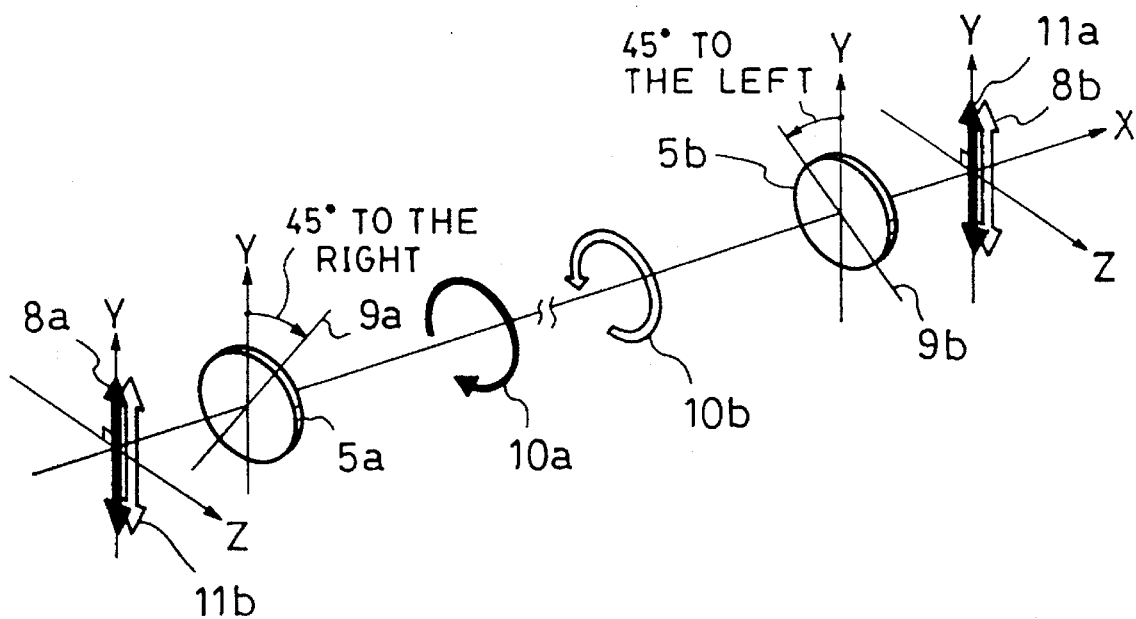

FIGS. 2(A) and 2(B) illustrate an apparatus 12a (shown in FIG. 3) having the same structure as that of the apparatus 1a except that the optical axis of the entire optical system, including the light-emitting element and the light-receiving element, is rotated by 45 degrees to the right as viewed from the front side of the apparatus and an apparatus 12b having the same structure as that of the apparatus 12a. The apparatus 12a is installed with the optical axis 9a of the quarter-wave plate 5a aligned in the horizontal direction, while the apparatus 12b is installed with the optical axis 9b of the quarter-wave plate 5b aligned in the vertical direction.

Transmission of a light signal from the optical communication apparatus 12a to the apparatus 12b will be described.

The laser beam La is emitted from the laser diode 2a as a linearly polarized light whose plane of polarization is inclined by 45 degrees to the right from the Y-axis, as shown in FIG. 2(B). The joining surface 4aa of the polarization beam splitter 4a reflects most of this laser beam La. The reflected laser beam is incident on the quarter-wave plate 5a whose optical axis 9a lies in the horizontal direction. Thus, the laser beam La emerges from the quarter-wave plate 5a as a circularly polarized light 10a, and is then transmitted toward the apparatus 12b.

The laser beam La incident on the apparatus 12b emerges from the quarter-wave plate 5b whose optical axis 9b is coincident with the vertical direction as circularly polarized light whose plane of polarization 11a is inclined by 45 degrees to the right from the upper direction of the vertical direction. The joining surface 4bb of the polarization beam splitter 4b transmits most of the laser beam La. The laser beam La is incident on the light-receiving element 7b.

Transmission of a light signal from the apparatus 12b to the apparatus 12a is performed in the same manner as that of the above-described case. In the apparatus 12b, the laser beam Lb whose plane of direction 8b makes an angle of 45 degrees in the leftward direction with respect to the Y-axis emerges from the quarter-wave plate 5b as a circularly polarized light 10b. This laser beam Lb is transmitted toward the apparatus 12a. The laser beam Lb, which is incident on the apparatus 12a, emerges from the quarter-wave plate 5a as a linearly polarized light whose plane of polarization 11b makes an angle of 45 degrees in the leftward direction with respect to the Y-axis. The joining surface 4aa of the polarization beam splitter 4a transmits most of the laser beam Lb. The transmitted laser beam Lb is incident on the light-receiving element 7a.

Thus, very efficient two-way communications can be performed when an optical axis of the quarter-wave plate of one of the apparatuses is rotated by 90 degrees relative to the optical axis of the quarter-wave plate of the other apparatus. Setting of the rotational angle is performed during installation of the apparatuses.

In the first and second embodiments, the light reflected by the joining surface of the polarization beam splitter is transmitted. However, it may also be arranged such that the joining surface of the polarization beam splitter passes most of the light beam emitted from the laser diode for transmission. This is achieved by moving the laser diode to the position of the light-receiving element and by shifting the light-receiving element to the position of the laser diode. Further, the same principle as that shown in FIG. 1 can be adopted and the same effect as that obtained in FIG. 1 can be obtained even when communications are performed between an apparatus having the same structure as that of the apparatus 1a except that the entire optical system, including a light-emitting element and a light-receiving element, is rotated by 90 or 180 degrees to the left or by 90 degrees to the right about the common optical axis and a remote apparatus having the same structure as that of the above apparatus.

Further, in the first and second embodiments, a portion of the laser beam emitted from the laser diode is reflected by a second surface of the quarter-wave plate. Since the plane of polarization of this reflected light is perpendicular to the plane of polarization of an incident light, the joining surface of the polarization beam splitter in the apparatus where the laser diode is provided passes most of it. The light beam that has passed through the joining surface is condensed on the light-receiving element in the apparatus by the lens group having a positive power, thus causing cross-talk. In order to prevent such a problem, the quarter-wave plates 5a and 5b of the first and second embodiments are slightly inclined with respect to the Y-Z plane so that the light reflected by the second surface of the quarter-wave plate deviates from the light receiving area of the light-receiving element in that apparatus where the quarter-wave plate is provided.

In the second embodiment, whatever angle the apparatus 1a or 1b is rotated about the common optical axis, since the light propagates in the transmission space as a circularly polarized light, the polarized state of the laser beam has the same relation as that obtained in FIG. 1 (B). Therefore, two-way communications can be performed without reducing transmission/reception efficiency even when the installation site of the apparatus is not flat and hence the planes of polarization 8a and 8b of the transmission laser beams La and Lb make an angle with respect to the Y-Z plane. Particularly, when this invention is applied to a two-way communication system employed in space, it can simplify the posture control system thereof.

FIGS. 4(A)–4(E) and 5(A)–5(E) schematically illustrate the essential parts of other optical systems.

Whereas the optical system of the first and second embodiments employ a quarter-wave plate for the phase plate, the third and fourth embodiments employ a half-wave plate. The other structure is the same as that of the first and second embodiments. In the third and fourth embodiments, the apparatuses are installed with the half-wave plate of one of the apparatuses inclined by a predetermined angle with respect to the half-wave plate of the other apparatus. When communications are performed in that state, efficient two-way communications can be performed. Identical reference numerals in FIGS. 4(A)–4(E) and 5(A)–5(E) to those in FIGS. 1(A) and 1(B) and 2(A) and 2(B) represent similar or identical elements.

FIGS. 4(B), 5(B), and 5(C) show examples in which the half-wave plate of one of the apparatuses is rotated by 45 degrees with respect to the half-wave plate of the other apparatus. This rotation is done during installation of the communication system. FIG.4(C) shows an example in which the rotational angle between the half-wave plates of the two apparatuses is 90 degrees. FIGS. 4(D), 4(E), 5(D), and 5(E) show examples in which the rotational angle between the half-wave plates of the two apparatuses is 0 degrees.

Changes in a polarized state of the laser beam will now be described. FIG. 4(B) shows how a polarized state of the laser beam changes in a system in which communications are performed between an apparatus 13a having the same structure as that of the apparatus 1a, shown in FIGS. 1(A) and 1(B) except that the optical axis of the half-wave plate, replacing the quarter-wave plate, is inclined by 45 degrees to the right from the upward direction of the vertical direction as viewed from the front side of the apparatus and an apparatus 13b in which the optical axis of the half-wave plate coincides with the vertical direction.

A linearly polarized light incident on a half-wave plate, with its plane of polarization making an angle of θ with the optical axis thereof, emerges from the half-wave plate as a circularly polarized light whose plane of polarization makes an angle of 2θ with the plane of polarization of the incident light.

Thus, in the structure shown in FIG. 4(B), since an optical axis 15a of a half-wave plate 14a is inclined by 45 degrees to the right of the plane of polarization 8a of the incident laser beam La, as viewed from the front side of the apparatus, the laser beam La emerges from the half-wave plate 14a as polarized light whose plane of polarization 16a is rotated by 90 degrees to the right, i.e., whose plane of polarization 16a is coincident with the vertical direction (the Y axis in FIGS. 4(A)–4(E)). This laser beam La propagates in space and reaches a remote apparatus 13b. As mentioned above, since an optical axis 15b of a half-wave plate 14b of the apparatus 13b is coincident with the vertical direction, the laser beam La passes through the half-wave plate 14b without the plane of polarization thereof changed, and emerges from the plate 14b as a polarized light whose plane of polarization 11a is coincident with the vertical direction. A light-receiving element of the apparatus 13b receives most of the light beam La emerging from the half-wave plate 14b.

FIG. 4(C) shows a system in which the optical axis of the half-wave plate of the apparatus 13a is inclined by 22.5 degrees to the right from the upward direction of the vertical direction as viewed from the front side of the apparatus while the optical axis of the half-wave plate of the apparatus 13b is inclined by 67.5 degrees to the left from the upward direction of the vertical direction. The polarized state of the laser beam changes in the same manner as that of the polarized state obtained in FIG. 4 (B), and the same effect as that of FIG. 4(B) can be obtained.

FIG. 4(D) shows a system in which the optical axes of the half-wave plates of apparatuses 13a and 13b are inclined by 22.5 degrees to the right from the upward direction of the vertical direction as viewed from the front side of the apparatus. The same effect as that obtained in the above-described cases can be obtained. The polarized state of the laser beam changes in the same manner as that of the polarized state obtained in FIG. 4 (B), and the same effect as that obtained in FIG. 4(B) can be obtained during communications even when the optical axes of the half-wave plates of apparatuses 13a and 13b are inclined by 22.5 degrees to the left, and even when the optical axes of the half-wave plates of the apparatuses 13a and 13b are inclined by 67.5 degrees to the right, as shown in FIG. 4(E), or even when the optical axes of the half-wave plates of the apparatuses 13a and 13b are inclined by 67.5 degrees to the left.

The same principle as that shown in FIGS. 4(A)–4(E) can be adopted and the same effect as that obtained in those figures can be obtained even when communications are performed between an apparatus having the same structure as that of the apparatus 13a shown in FIG. 4(A) except that the entire optical system excluding the half-wave plate 14a, including a light-emitting element and a light-receiving element, is rotated by 90 or 180 degrees to the left or by 90 degrees to the right about the common optical axis and a remote apparatus having the same structure as that of the above apparatus.

FIGS. 5(A)–5(E) show examples in which the present invention is applied to an apparatus 16a having the same structure as that of the apparatus 12a (shown in FIG. 2) of the second embodiment except for the quarter-wave plate. The apparatus 16a employs a half-wave plate in place of the quarter-wave plate.

FIG. 5(B) shows a system in which communications are performed between an apparatus 16a in which the optical axis of the half-wave plate is inclined by 22.5 degrees to the left from the upward direction of the vertical direction as viewed from the front side of the apparatus and an apparatus 16b in which the optical axis of the half-wave plate is inclined by 22.5 degrees to the right. In this example, a polarized state of the laser beam changes in a different manner from that of the cases shown in FIGS. 4(A)–4(E). That is, the plane of polarization of the transmission light that enters the half-wave plate, e.g., 8a, is coincident with the plane of polarization 11a of the light emerging from the half-wave plate of the remote apparatus after being received by the remote apparatus. Thus, the joining surface 4bb of the polarization beam splitter 4b separates the transmission and received lights very efficiently, as has been described in connection with the second embodiment shown in FIGS. 2(A) and 2(B). Transmission of a light signal from the apparatus 16b to the apparatus 16a is performed in the same manner as that of the above-described case. Thus, the same effect as that obtained in the examples shown in FIGS. 4(A)–4(E) can be obtained.

The same effect as that obtained in the examples shown in FIGS. 4(A)–4(E) also can be obtained when communications are performed between an apparatus 16a in which the optical axis of the half-wave plate is inclined by 22.5 degrees to the right from the upward direction of the vertical direction as viewed from the front side of the apparatus and an apparatus 16b in which the optical axis of the half-wave plate is inclined by 22.5 degrees to the left.

The same effect as that obtained in the examples shown in FIGS. 4(A)–4(E) also can be obtained when communications are performed between an apparatus 16a in which the optical axis of the half-wave plate is inclined by 67.5 degrees to the left from the upward direction of the vertical direction as viewed from the front side of the apparatus and an apparatus 16b in which the optical axis of the half-wave plate is inclined by 67.5 degrees to the right, as shown in FIG. 5(C), or when communications are performed between an apparatus 16a in which the optical axis of the half-wave plate is inclined by 67.5 degrees to the right from the upward direction of the vertical direction as viewed from the front side of the apparatus and an apparatus 16b in which the optical axis of the half-wave plate is inclined by 67.5 degrees to the left.

FIG. 5(D) shows a system in which the optical axes of the half-wave plates of apparatuses 16a and 16b are inclined by 45 degrees as viewed from the front side thereof. The same effect as that obtained in the cases shown in FIGS. 4(A)–4(E) can be obtained in a structure similar to that shown in those figures, regardless of the direction in which the optical axis of the half-wave plate is inclined.

FIG. 5(E) shows a system in which the optical axes of the half-wave plates of apparatuses 16a and 16b are coincident with the vertical direction. The same effect as that obtained in the cases shown in FIGS. 4(A)–4(E) can be obtained. Further, the same effect as that obtained in the cases shown in FIGS. 4(A)–4(E) can be obtained in a system employing combinations of apparatuses in which the optical axes of the half-wave plates are coincident with either the vertical or horizontal direction.

The same principle as that shown in FIGS. 5(A)–5(E) can be adopted and the same effect as that obtained in FIGS. 1(A)–1(B) can be obtained even when communications are performed between an apparatus having the same structure as that of the apparatus 16a with the exception that the entire optical system excluding the half-wave plate 14a, including a light-emitting element and a light-receiving element, is rotated by 90 or 180 degrees to the left or by 90 degrees to the right about the common optical axis and a remote apparatus having the same structure as that of the above apparatus.

The embodiments shown in FIGS. 4(A)–4(E) and 5(A)–5(E) also may be constructed such that the rotational angle setting position of the half-wave plate is marked and that there is a play of the rotation so that the light receiving level of the apparatus, which receives the light signal, can be adjusted to a maximum value by finely rotating the half-wave plate while looking at the light receiving level of that apparatus. In this way, even when the installation site of the apparatus is not flat and hence the planes 8a and 8b of the polarization of the transmission laser beams La and Lb make an angle with respect to the Y-Z plane, a reduction in the transmission/reception efficiency, caused by an angular deviation of the planes 8a and 8b of polarization, can be prevented.

Further, when a reduction in the transmission/reception efficiency caused by an angular deviation of the planes 8a and 8b of polarization with respect to the Y-Z plane, e.g., by a difference in the posture generated between the apparatuses when the system is installed, can be ignored, the optical communication apparatuses associated with two-way communications may have the same structure including the direction of the optical axes of the half-wave plates, as shown in FIG. 4(D), 4 (E), 5(D), or 5(E). In that case, the half-wave plate is not fixed.

Although the light reflected by the joining surface of the polarization beam splitter is transmitted in the third and fourth embodiments, it also may be arranged such that the joining surface of the polarization beam splitter passes most of the light beam emitted from the laser diode for transmission, as in the case of the first and second embodiments. This is achieved by moving the laser diode to the position of the light-receiving element and by shifting the light-receiving element to the position of the laser diode.

In the third and fourth embodiments, since the plane of polarization of the light reflected by the second surface of the wave plate is the same as the plane of polarization of the light entering the wave plate, the amount of light returning to the light-receiving element of that apparatus is much less than that in the first and second embodiments. However, if reception loss, which is caused by a deterioration in the transparency of the propagating space or by optical axis alignment errors between the apparatuses, is great, a reduction of as much as possible in the amount of reflected light returning to the light-receiving element of that apparatus is desired. Thus, the optical axes of the half-wave plates 14a and 14b may be slightly inclined with respect to the Y-Z plane, as in the case of the first and second embodiments.

As will be understood from the foregoing description, the optical communication apparatus according to the present invention includes a light emitting optical system having light emission means for emitting a linearly polarized light, a light receiving optical system, a polarization beam splitter, and a phase plate, which is rotatable by a predetermined angle about a common optical axis for transmission and reception lights. The optical axis of the phase plate of each of the two apparatuses associated with communications is set to an adequate angle before the apparatuses are installed. Consequently, excellent two-way communication can be performed when communication is performed between apparatuses having the same structure.

As compared with a system in which two-way communication is performed between a combination of two types of apparatuses, the present invention is advantageous in terms of product maintenance cost. That is, it is necessary for the user to possess only a single apparatus as a preliminary apparatus, and this is very advantageous for operation.

Further, if a laser diode whose polarization ratio is between 100:1 and 500:1 and a polarization beam splitter whose light extinction ratio is 0.02 or below are employed, very efficient two-way communications can be performed with a very low level of cross-talk.

The individual components shown in outline or block form in the figures are individually well-known and their internal construction and operation are not critical either to the making or using of this invention or to a description of the best mode of the invention.

While the present invention has been described with respect to what is presently considered to be the preferred embodiments, it is to be understood that the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical communication apparatus comprising:
    a light-emitting optical system comprising light-emission means for transmitting a linearly polarized light beam along a transmitting optical axis to a remote optical communication apparatus;
    a light-reception optical system for receiving a polarized light beam, along a receiving optical axis, which is transmitted from the remote apparatus;
    a polarization beam splitter located along a coincident optical axis where the transmitting optical axis coincides with the receiving optical axis, said polarization beam splitter reflecting one of and transmitting the other of the linearly polarized light beam to the remote apparatus and the polarized light beam from the remote apparatus; and
    a phase plate rotatable to a predetermined angle about the coincident optical axis, said phase plate effecting at least one of (i) transmitting and (ii) of altering the polarization of both the linearly polarized light beam to the remote apparatus and the polarized light beam from the remote apparatus, to allow communication between said optical communication apparatus and the remote apparatus.

2. An optical communication apparatus according to claim 1, wherein said phase plate comprises a quarter-wave plate and wherein the predetermined angle that said quarter-wave plate is rotated is 90 degrees.

3. An optical communication apparatus according to claim 1, wherein said phase plate comprises a half-wave plate, and wherein the predetermined angle through which said half-wave plate is rotated is one of 0, 45 and 90 degrees.

4. An optical communication apparatus according to claim 3, wherein said half-wave plate has a rotational play required for adjusting the predetermined angle.

5. An optical communication apparatus according to claim 1, wherein said polarization beam splitter reflects the linearly polarized light beam to the remote apparatus, and transmits the polarized light beam from the remote apparatus.

6. An optical communication apparatus according to claim 1, wherein said phase plate is slightly inclined relative to a plane which is perpendicular to the coincident optical axis.

7. An optical communication apparatus comprising:
    a light-emitting optical system comprising light emission means for transmitting a linearly polarized light beam along a transmitting optical axis to a remote optical communication apparatus;
    a light reception optical system for receiving a polarized light beam, along a receiving optical axis, which is transmitted from the remote apparatus;
    a polarization beam splitter located along a coincident optical axis where the transmitting optical axis coincides with the receiving optical axis, said polarization beam splitter reflecting one of and transmitting the other of the linearly polarized light beam to the remote apparatus and the polarized light beam from the remote apparatus; and
    a half-wave plate rotatable to a predetermined angle about the coincident optical axis, said half-wave plate having the ability to alter the polarization of light transmitted therethrough, said half-wave plate transmitting both the linearly polarized light beam to the remote apparatus and the polarized light beam from the remote apparatus, to allow communication between said optical communication apparatus and the remote apparatus.

8. An optical communication apparatus according to claim 7, wherein said phase plate is slightly inclined relative to a plane which is perpendicular to the coincident optical axis.

9. An optical communication apparatus according to claim 7, wherein a vertical plane coincides with the coincident optical axis and a predetermined angle of 0 degrees on said half-wave plate, and a horizontal plane coincides with the coincident optical axis and is normal to the vertical plane, the predetermined angle of said half-wave plate is set to one of 22.5 degrees and 67.5 degrees when a plane of polarization of the linearly polarized light beam to the remote apparatus is coincident with one of the vertical plane and the horizontal plane.

10. An optical communication apparatus according to claim 7, wherein a vertical plane coincides with the coincident optical axis and a predetermined angle of 0 degrees on said half-wave plate, the predetermined angle of said half-wave plate is set to 45 degrees when a plane of polarization of the linearly polarized light beam to the remote apparatus is inclined by 45 degrees with respect to the vertical plane.

11. A communication system, comprising:
    a first optical communication apparatus; and
    a second optical communication apparatus,
    wherein said first optical communication apparatus comprises
        a first light-emitting optical system comprising first light-emission means for transmitting a linearly polarized light beam along a transmitting optical axis to said second optical communication apparatus;
        a first light-reception optical system for receiving a polarized light beam, along a receiving optical axis, which is transmitted from the second optical communication apparatus;
        a first polarization beam splitter located along a coincident optical axis where the transmitting optical axis coincides with the receiving optical axis, said first polarization beam splitter reflecting one of and transmitting the other of the linearly polarized light beam to the second optical communication apparatus and the polarized light beam from the second optical communication apparatus; and a first phase plate for altering the polarization state of both the linearly polarized light beam transmitted to the second optical communication apparatus and the polarized beam received from the second optical communication apparatus, and wherein said second optical communication apparatus comprises a second light-emitting optical system comprising second light-emission means for transmitting a linearly polarized light beam along a transmitting optical axis to said first optical communication apparatus;

a second light-reception optical system for receiving a polarized light beam, along a receiving optical axis, which is transmitted from the first optical communication apparatus;

a second polarization beam splitter located along a coincident optical axis where the transmitting optical axis coincides with the receiving optical axis, said second polarization beam splitter reflecting one of and transmitting the other of the linearly polarized light beam to the first optical communication apparatus and the polarized light beam from the first optical communication apparatus; and a second phase plate for altering the polarization state of both the linearly polarized light beam transmitted to the first optical communication apparatus and the polarized beam received from the first optical communication apparatus.

12. A communication system according to claim 11, wherein both of said first and second phase plates are half-wave plates.

13. A communication system according to claim 11, wherein each of the optical axes of the laser beams emitted from said first and second light-emitting optical systems to said first and second polarization beam splitters is inclined by 45 degrees to the vertical direction as viewed from the front sides of said first and second optical communication apparatus.

* * * * *

UNITED STATES PATENT AND TRADEMARK OFFICE
CERTIFICATE OF CORRECTION

PATENT NO. : 5,530,577
DATED : June 25, 1996
INVENTOR(S) : Orino et al.

It is certified that error appears in the above-indentified patent and that said Letters Patent is hereby corrected as shown below:

On the title page:
[56] References Cited

FOREIGN PATENT DOCUMENTS

"1305734  12/1989  Japan" should read --1-305734 12/1989  Japan--; and
"0305734  12/1989  Japan" should be deleted.

COLUMN 1:

Line 65, "transmitted" should read --transmitted,--.

COLUMN 12:

Line 51, "prises" should read --prises:--.

COLUMN 13:

Line 7, "comprises" should read --comprises:--.

Signed and Sealed this

Twenty-second Day of October, 1996

Attest:

BRUCE LEHMAN

*Attesting Officer*      *Commissioner of Patents and Trademarks*